Nov. 19, 1935.  O. D. NORTH ET AL  2,021,568
PUNCTURE INDICATOR FOR PNEUMATIC TIRES
Filed July 27, 1932
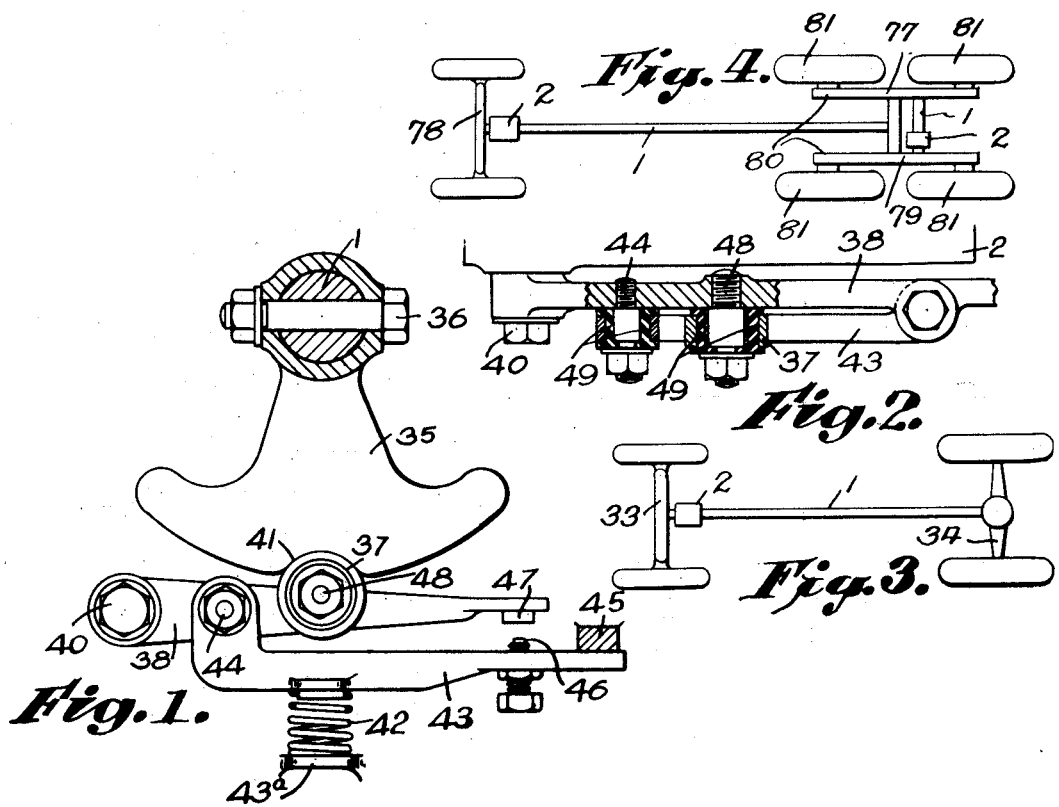
INVENTOR
OLIVER D. NORTH & PERCY G. HUGH
PER Rayner &
ATTORNEYS.

Patented Nov. 19, 1935

2,021,568

UNITED STATES PATENT OFFICE 2,021,568

PUNCTURE INDICATOR FOR PNEUMATIC TIRES

Oliver Danson North, Chelsea, London, and Percy Garibaldi Hugh, London, England, assignors to Scammell Lorries Limited, London, England Application July 27, 1932, Serial No. 625,002
In Great Britain August 4, 1931

3 Claims. (Cl. 200—58)

This invention relates to a puncture indicator for pneumatic tires and has for its object to provide a simple and effective means for indicating to the driver of a motor vehicle having pneumatic tires when one of the tires has become deflated or punctured and thus avoid the damage and probable destruction of the tire which will result if the vehicle is driven on a flat tire.

According to this invention a tire deflation indicator is provided with indicating means operated by displacement of the axis of a wheel relatively to the predetermined normal position of such axis, and it is in the form of a switch comprising two contiguously located contacts and switch operating means for bringing said contacts together when a tire either side of the vehicle is deflated, said means comprising a switch actuating member mounted for oscillation relatively to said contacts and connected for actuation to a part of the vehicle displaceable consequent upon deflation of a tire, means being provided with said oscillatable member normally maintaining said contacts separated but bringing the contacts together consequent upon displacement of part of the vehicle to the extent permitted by deflation of a tire. The relative angular movement between any two pairs of wheels can be utilized to actuate the puncture indicator or alarm. In an ordinary four-wheeled motor vehicle having two driving wheels mounted upon an axle and two steering wheels also mounted upon an axle, the relative movements between the two axles may be utilized to actuate the puncture indicator. In vehicles having a large number of wheels where pairs of wheels are mounted at the ends of balance arms then the relative movement between the two balance arms may be used to actuate the puncture indicator. A similar arrangement may be employed in connection with pairs of wheels mounted to oscillate about a substantially longitudinal axis. Where the pairs of wheels are not already connected by axles, balance arms or other existing connections then light connecting bars or links may be provided between the pairs of wheels and the relative movements between these bars or links utilized for actuating the puncture indicator.

In order that our invention may be clearly understood and readily carried into effect we have appended hereto a sheet of drawings illustrating an embodiment thereof and wherein:—

Fig. 1 is a part sectional side elevation view of a circuit closing device.

Fig. 2 is a part sectional plan view of Fig. 1 with the segmental oscillating member hereinafter described omitted.

Fig. 3 is a diagrammatic plan view showing how a box accommodating a switch such as that shown in Fig. 1 can be applied to an ordinary rigid four wheel vehicle.

Fig. 4 is a diagrammatic plan view showing a combination of switch boxes suitable for a six wheeled vehicle with driving wheels mounted on rocker arms.

Referring to the drawing in the embodiment shown in Figs. 1 and 2 two axles or balance arms are connected by a rod 1 and a contact housing 2, the rod 1 being fixed at one end to one of the axles or balance arms and rotating at its other end in the housing 2, the housing being fixed to the other axle or balance arm.

An application of the device shown in Figs. 1 and 2 is diagrammatically illustrated in Fig. 3 in which the box 2 is secured to the front axle 33 and the rod 1 is secured to the rear axle 34 so that angular movement of one axle relatively to the other results in the rod 1 and box 2 rotating relatively to each other and the closing of the alarm circuit.

The rod 1 carries a segmental plate 35 secured by a bolt 36 to the centre pin or other convenient part of the rocker arm, and its arcuate edge travels over a roller 37 carried by an arm 38 between its ends, such arm pivoting at one end on a bolt 40 secured to a suitable fixed part of the vehicle, or the segmental plate 35 may be fixed and the bolt 40 secured to the rocker arm or other oscillating part. The centre of the arcuate edge of the plate 35 is formed with a depression 41 which normally receives part of the periphery of the roller 37, consequently when there is angular displacement of the rocker arm the plate 35 will ride over the roller 37 or vice versa and the arm 38 will be depressed against the influence of a coiled compression spring 42 interposed between an abutment 43a and a supplementary arm 43 bent upwards and pivoted at one end by a bolt 44 to the arm 38 between the roller 37 and the pivot bolt 40. The free end of the arm 43 is pressed upwards against an abutment 45 and contiguous thereto is an electrical contact 46 in the arm 43 adapted upon depression of the arm 38 to be engaged by a contact 47 on the free end of the arm 38 so as to close the circuit of the alarm. The bolt 44 can serve as a terminal for the contact 47 or a bolt 48 supporting the roller 37 may serve the same purpose both of these bolts being insulated by insulating bushes 49 from the arm 43, the bolt 40 also if necessary being similarly insulated from the vehicle part to which it is affixed. The segmental plate 35 can be secured by the bolt 36 to the rod 1 shown in Fig. 1 the arm 38 being secured to one of the axles instead of the box 2, or the rod 1 can be secured to one of the rocker arms co-axial with its pivot and the arm 38 secured to an oppositely located rocker arm.

It will be apparent that with a six wheeled vehicle as shown in Fig. 4 the rod 1 can be secured to the rear axle 77 and the box 2 to the front axle 78 or vice versa or can be coupled across approximately the points of oscillation of the rocker arms 80 of the two pairs of driving wheels 81.

This invention is particularly applicable to heavy motor lorries having large section pneumatic tires and especially to such vehicles in which the wheels are arranged in pairs mounted upon balance arms, pivoted springs or other supporting means. It is also applicable in connection with such wheels upon the trailer of motor vehicles. In these cases it is often difficult for the driver to detect when one of the tires (especially in the rear portion of the vehicle) has been punctured. This invention will provide a definite indication to the driver when a tire has become deflated and will thus save the serious loss which would occur owing to one of these large section tires being destroyed through the vehicle being driven with the tire flat.

We claim:—

1. In a tire deflation indicator, a switch comprising a pair of normally spaced contacts, an arm carrying one of said contacts, an oscillatable cam member, a spring maintaining said arm in a neutral position with the contacts separated, an axially rotatable rod connected to said oscillatable member and to a part of the vehicle which is displaced consequent upon deflation of a tire to rotate said rod and oscillate said oscillatable member, a further arm carrying the other contact said first mentioned arm being pivoted between its ends to said further arm, and at one end to a pivotal support, its other end being free, said two arms being normally substantially parallel, said spring pressing against said further arm so that the said first mentioned arm is pressed at a point between its connection to the said further arm and its free end against the cam surface of said oscillatable member.

2. In a tire deflation indicator, a switch comprising a pair of normally spaced contacts, an arm carrying one of said contacts, an oscillatable member, a spring maintaining said arm in a neutral position with the contacts separated, an axially rotatable rod connected to said oscillatable member and to a part of the vehicle which is displaced consequent upon deflation of a tire to rotate said rod and oscillate said oscillatable member, a further arm carrying the other contact said first mentioned arm being pivoted between its ends to said further arm and at one end to a pivotal support, its other end being free, said two arms being normally substantially parallel, said spring pressing against said further arm at a point between its ends, the said first mentioned arm being pressed at a point between its connection to the said further arm and its free end against said oscillatable member, said oscillatable member having an arcuate free edge, a recess in said free edge, and a roller on said first mentioned arm normally engaged in said recess by the influence of said spring.

3. In a tire deflation indicator, a switch comprising a pair of contact carrying members, means for moving one towards the other to engage the contacts consequent upon deflation of a tire, said means comprising an oscillatable member adapted to be oscillated consequent upon deflation of one of a number of tires, and means pressing one of said contact carrying members against the oscillatable member, a recess in said oscillatable member normally receiving an abutment carried by the contact carrying member which is pressed against it, the arrangement being that said contacts are engaged when said oscillatable member has been moved from its normal position through a small angle when a tire is deflated.

OLIVER DANSON NORTH.
PERCY GARIBALDI HUGH